(12) United States Patent
Lai et al.

(10) Patent No.: US 6,386,496 B1
(45) Date of Patent: May 14, 2002

(54) PRESS-CONTROL RETAINING DEVICE

(75) Inventors: Chin-Kuo Lai, Ping-Chen; Jen-Lung Hsu, Miaoli Hsien, both of (TW)

(73) Assignee: Taiwan Industrial Fastener Corp., Taipei (TW)

( * ) Notice: Subject to any disclaimer, the term of this patent is extended or adjusted under 35 U.S.C. 154(b) by 2 days.

(21) Appl. No.: 09/722,536

(22) Filed: Nov. 28, 2000

(30) Foreign Application Priority Data

Mar. 15, 2000 (TW) .......................................... 089204128

(51) Int. Cl.$^7$ .................................................. A47F 5/00
(52) U.S. Cl. ........................ 248/309.1; 24/629; 24/647; 248/222.12
(58) Field of Search ........................... 248/309.1, 311.2, 248/313, 316.1, 316.7, 316.2, 221.11, 222.12, 222.13, 222.14, 229.16, 229.26, 230.7, 231.81, 100, 101, 110, 113, 306, 685, 541; 24/115 G, 136 R, 629, 647

(56) References Cited

U.S. PATENT DOCUMENTS

| | | | | |
|---|---|---|---|---|
| 4,492,232 A | * | 1/1985 | Green | .......................... 128/325 |
| 5,222,279 A | * | 6/1993 | Frano et al. | ................... 24/625 |
| 5,361,461 A | * | 11/1994 | Anscher | .................... 24/115 G |
| 5,527,319 A | * | 6/1996 | Green et al. | ................. 606/143 |
| 5,671,505 A | * | 9/1997 | Anscher | ..................... 24/115 G |
| 5,897,565 A | * | 4/1999 | Foster | .......................... 606/158 |
| 6,018,851 A | * | 2/2000 | Anscher | ............... 24/136 R X |
| 6,026,574 A | * | 2/2000 | Ghavami et al. | ............. 30/109 |
| 6,246,863 B1 | * | 6/2001 | Kampel | ....................... 455/100 |

* cited by examiner

Primary Examiner—Ramon O. Ramirez
Assistant Examiner—Tan Le
(74) Attorney, Agent, or Firm—Bacon & Thomas, PLLC

(57) ABSTRACT

A press-control retaining device includes a casing, the casing having two engagement flanges disposed at two sides, a retainer member supported on a spring inside the casing and adapted for securing to an external object, the retainer member having a substantially ⊓-shaped bottom positioning base supported on the spring and two springy arms upwardly outwardly extended from the bottom positioning base and adapted for clamping on an external object, the bottom positioning base comprising two first hooked portions bilaterally disposed at a bottom side, two stop flanges bilaterally disposed at a top side, and two second hooked portions respectively spaced between the first hooked portions and the stop flanges, and a slide coupled to the retainer member between the stop flanges and the second hooked portions. When pressing an external object on the retainer member to force the second hooked portions into engagement with the hooked portions of the engagement flanges of the casing, the arms are compressed inwards by the peripheral wall of the casing and clamped on the external object. When pushing the external object to move the retainer member downwards to the bottom limit position in the casing and then releasing the pressure from the external object, the first hooked portions are forced by the spring means into engagement with the engagement flanges, and the arms are released from the external object.

7 Claims, 6 Drawing Sheets

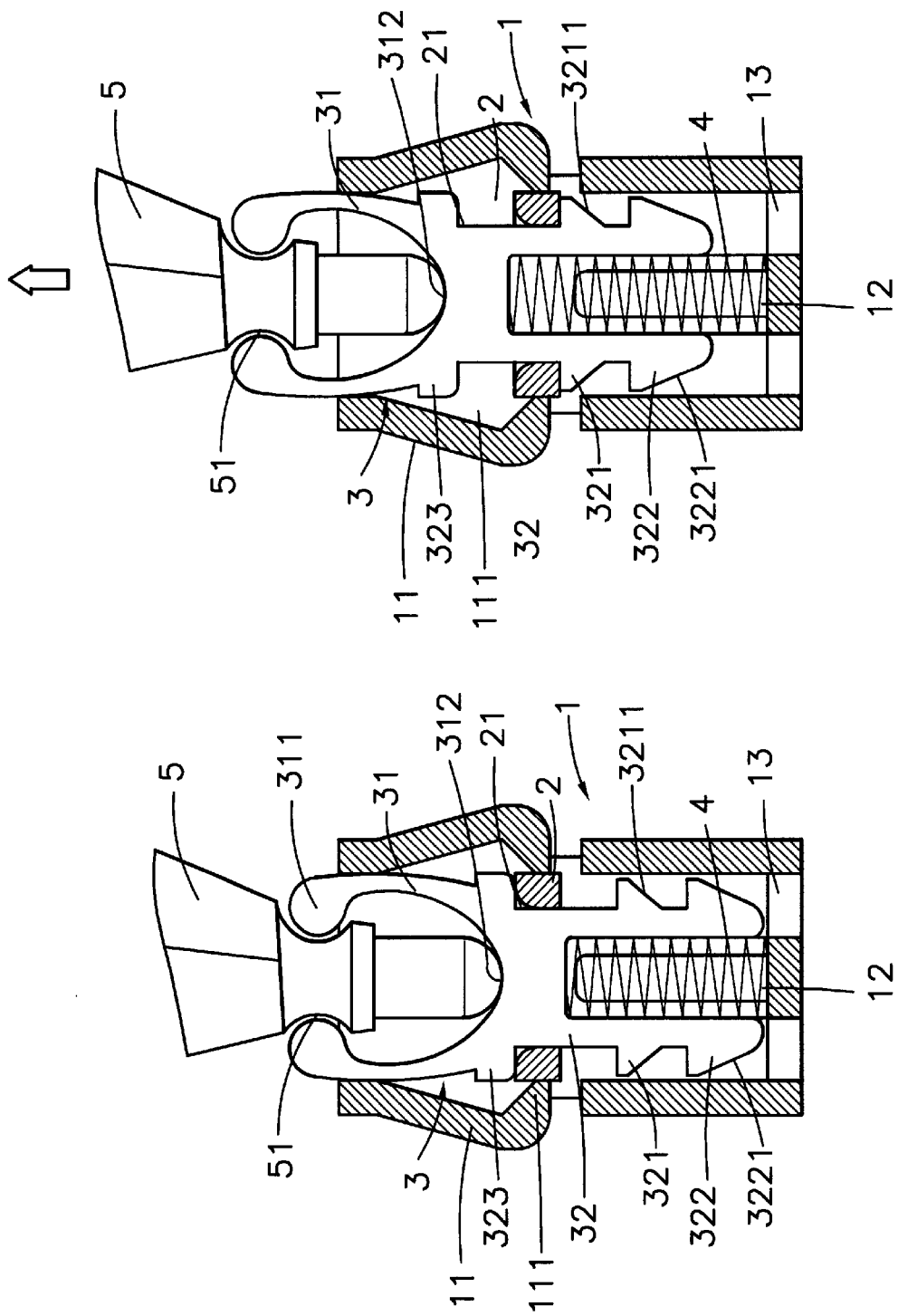

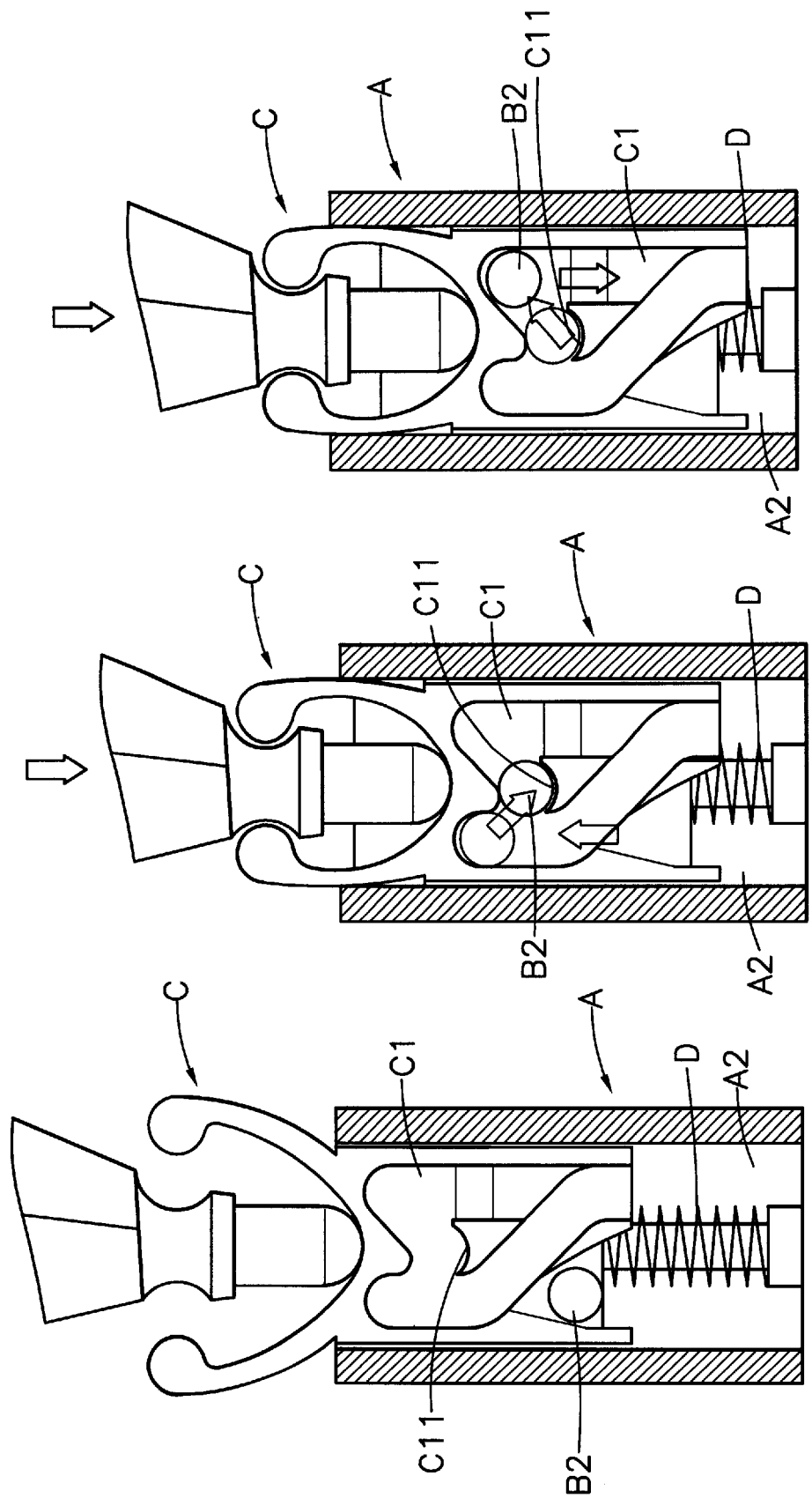

PRESS-CONTROL RETAINING DEVICE

BACKGROUND OF THE INVENTION

The present invention relates to a press-control retaining device and, more particularly, to such a press-control retaining device, which is comprised of a casing, a spring mounted in the casing, a retainer member supported on the casing and adapted for clamping on an external object, and a slide coupled to the retainer member for enabling the retainer member to be moved between the clamping position and the releasing position by means of press control.

FIG. 7 shows a press-control retaining device for use with a writing instrument, door lock, storage container lock, or the like. This structure of press-control retaining device comprises a casing A, a compression spring D, a control member B, and a retainer member C. The casing A comprises a top-open receiving chamber A2, and a side hole A1. The control member B is mounted in the top-open receiving chamber A2 of the casing A, comprising a positioning rod B1 horizontally disposed at a bottom side and engaged into the side hole A1, and a locating rod B2 horizontally disposed at a top side. The retainer member C is supported on the compression spring D, comprising a guide groove C1 and a retaining notch C11 at one end of the guide groove C1. Please refer also to FIGS. from 8 through 10. When pressing an external object on the retainer member C, the retainer member C is moved relative to the control member B, enabling the locating rod B2 to be forced into engagement with the retaining notch C11 to hold the retainer member C is the clamping position where the retainer member C is clamped on the external object. When pressing the retainer member C downwards further to the bottom limit position, the locating rod B2 is disengaged from the retaining notch C11, and therefore the retainer member C is pushed upwards by the compression spring D and disengaged from the external object after releasing of the downward pressure from the retainer member C. This structure of press-control retaining device still has drawbacks. Because the retainer member and the control member must match each other perfectly, the precision requirement is critical, and the molding cost is high. Further, the locating rod, the retaining notch and the guide groove wear quickly with use. When the locating rod, the retaining notch and the guide groove start to wear, the retainer member tends to be vibrated and forced away from the external object, or jammed in the casing.

SUMMARY OF THE INVENTION

The present invention has been accomplished to provide a press-control retaining device, which eliminates the aforesaid drawbacks. It is one object of the present invention to provide a press-control retaining device, which is less critical in precision requirement. It is another object of the present invention to provide a press-control retaining device, which can be positively moved between the clamping position and the releasing position. The press-control retaining device comprises a casing, the casing having two engagement flanges disposed at two sides, a retainer member supported on a spring inside the casing and adapted for securing to an external object, the retainer member having a substantially ⊓-shaped bottom positioning base supported on the spring and two springy arms upwardly outwardly extended from the bottom positioning base and adapted for clamping on an external object, the bottom positioning base comprising two first hooked portions bilaterally disposed at a bottom side, two stop flanges bilaterally disposed at a top side, and two second hooked portions respectively spaced between the first hooked portions and the stop flanges, and a slide coupled to the retainer member between the stop flanges and the second hooked portions. The engagement flanges of the casing and the arms of the retainer member are springy. When pressing an external object on the retainer member to force the second hooked portions into engagement with the hooked portions of the engagement flanges of the casing, the arms are compressed inwards by the peripheral wall of the casing and clamped on the external object. When pushing the external object to move the retainer member downwards to the bottom limit position in the casing and then releasing the pressure from the external object, the first hooked portions are forced by the spring means into engagement with the engagement flanges, and the arms are released from the external object.

BRIEF DESCRIPTION OF THE DRAWINGS

FIG. 5 is still another sectional view of the present invention showing the retainer member moved to the bottom limit position, the slide stopped between the hooked portions of the engagement flanges of the casing.

FIG. 6 is similar to FIG. 5 but showing the retainer member moved upwards in the casing, the second hooked portions of the retainer member stopped at the bottom side of the slide.

FIG. 8 is a sectional view of the retaining device according to the prior art before engagement between the arms of the retainer member and the external object.

FIG. 9 is similar to FIG. 8 but showing the arms of the retainer member clamped on the external object.

FIG. 10 is similar to FIG. 9 but showing the retainer member pressed again and moved to the bottom limit position in the casing.

DETAILED DESCRIPTION OF THE PREFERRED EMBODIMENT

Figure 1:
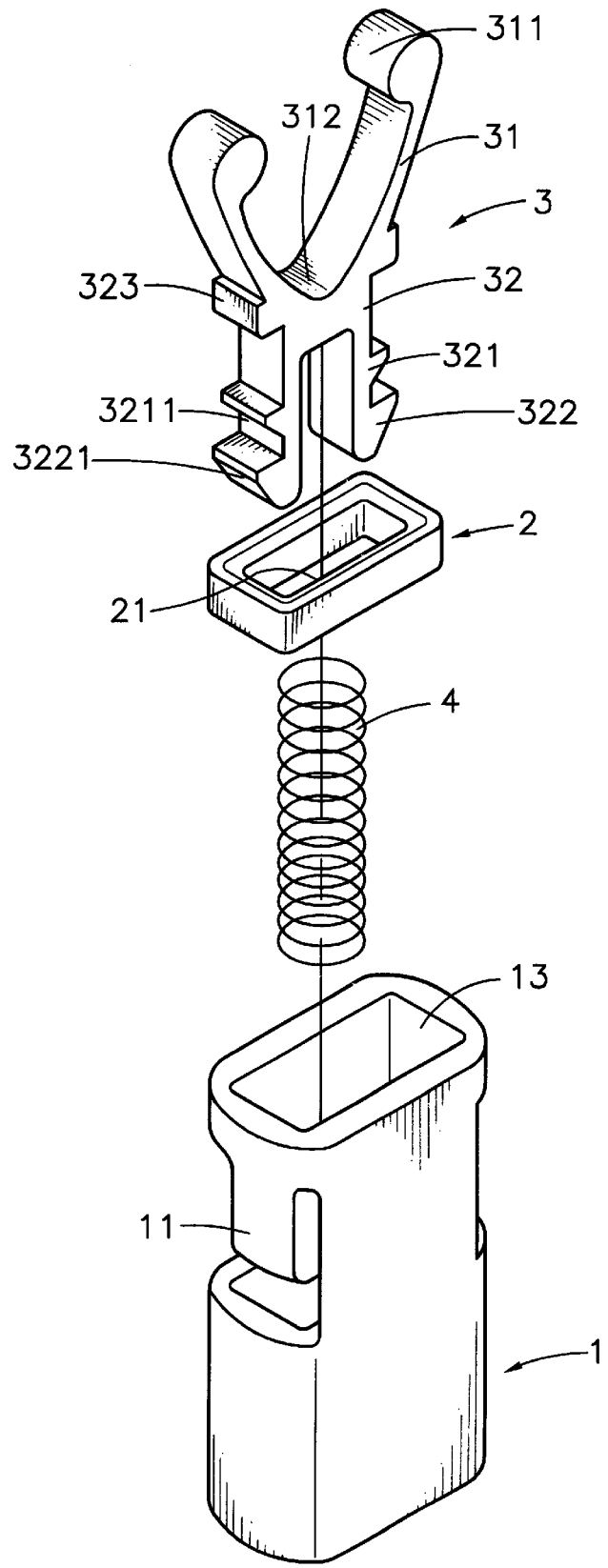
FIG. 1 is an exploded view of a press-control retaining device according to the present invention.
Figure 2:
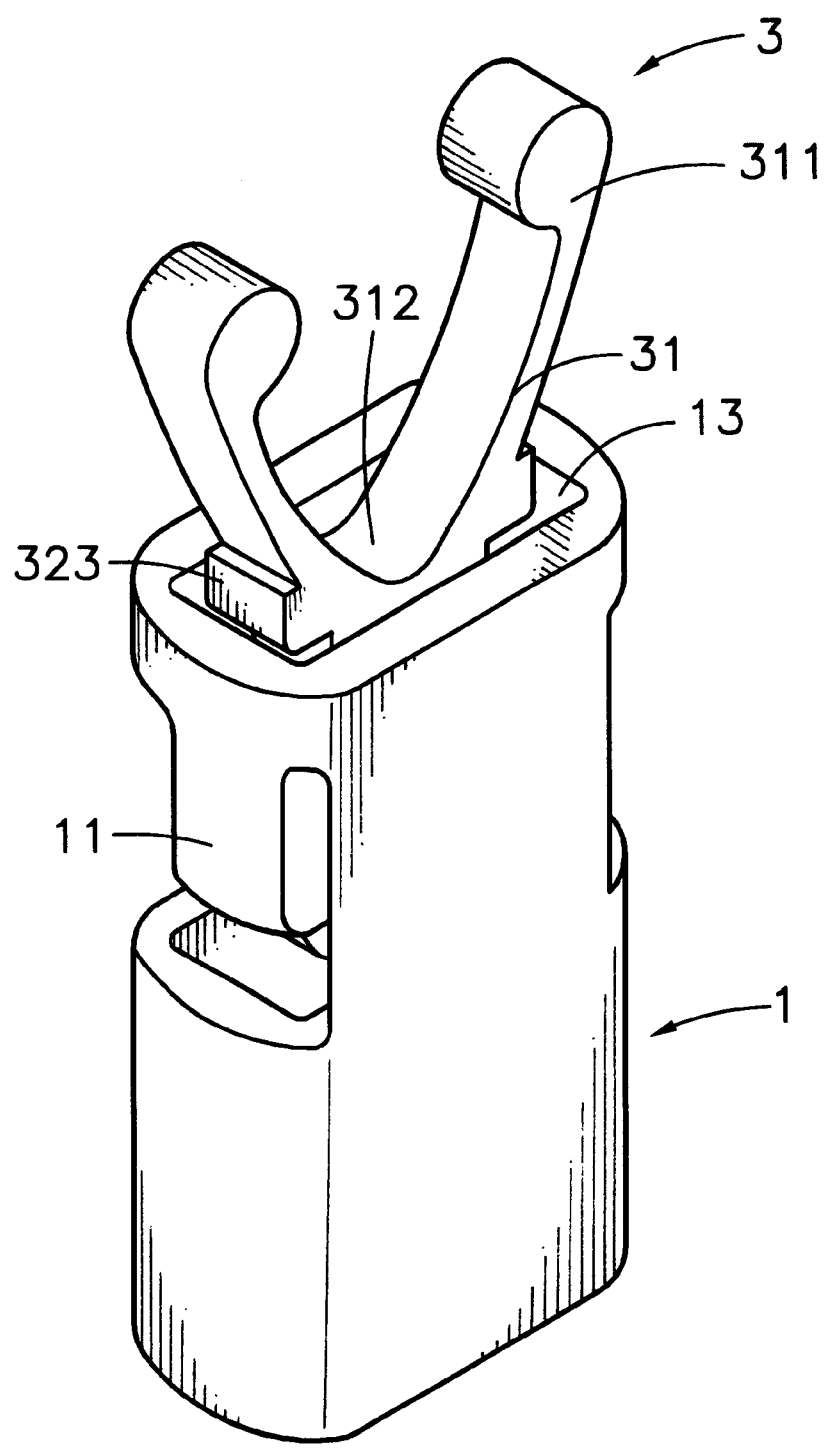
FIG. 2 is an elevational assembly view of the press-control retaining device according to the present invention.

Referring to FIGS. from 1 through 3, a press-control retaining device is shown comprised of a casing 1, a slide 2, a retainer member 3, and a spring 4. The casing 1 and the retainer member 3 are made of springy material. The casing 1 comprises a top-open receiving chamber 13, two springy engagement flanges 11 disposed at two sides of the top-open receiving chamber 13, the engagement flanges 11 each having a downwardly inwardly extended hooked portion 111, and an upright locating rod 12 disposed inside the top-open receiving chamber below the elevation of the engagement flanges 11. The slide 2 is moved up and down in the top-open receiving chamber 13 of the casing 1, comprising a center opening 21. The spring 4 is mounted on the upright locating rod 12 inside the top-open receiving chamber 13 of the casing 1. The retainer member 3 is inserted through the center opening 21 of the slide 2 and supported on the spring 4, comprising a substantially ⊓-shaped bottom positioning base 32 and two springy arms 31 curved upwardly outwardly from the top side of the bottom positioning base 32. The bottom positioning base 32 is inserted through the center opening 21 of the slide 2 and supported on the spring 4, comprising two first hooked portions 322 bilaterally disposed at the bottom side, two stop flanges 323 bilaterally disposed at the top side, and two second hooked portions 321 respectively spaced between the first hooked portions 322 and the stop flanges 323. The hooked portions 321 and 322 each have a beveled bottom edge 3211 or 3221. The arms 31 each have one end connected to each other and forming a bearing surface portion 312, and an opposite end terminating in a retaining end portion 311. The retaining end portion 311 may have any of a variety of shapes, for example, a circular, rectangular, or conical profile. Further, the horizontal length between two distal ends of the slide 2 is greater than the combined width of the second hooked portions 321 of the bottom positioning base 32 of the retainer member 3.

During assembly procedure, the bottom positioning base 32 of the retainer member 3 is inserted through the center opening 21 of the slide 2, enabling the slide 2 to be moved between the second hooked portions 321 and the stop flanges 323, and then the retainer member 3 is inserted with the slide 2 and the spring 4 into the top-open receiving chamber 13 of the casing 1, keeping the spring 4 coupled between the upright locating rod 12 and the bottom positioning base 32 of the retainer member 3 and the first hooked portions 322 hooked up with the engagement flanges 11 of the casing 1.

Figure 3:
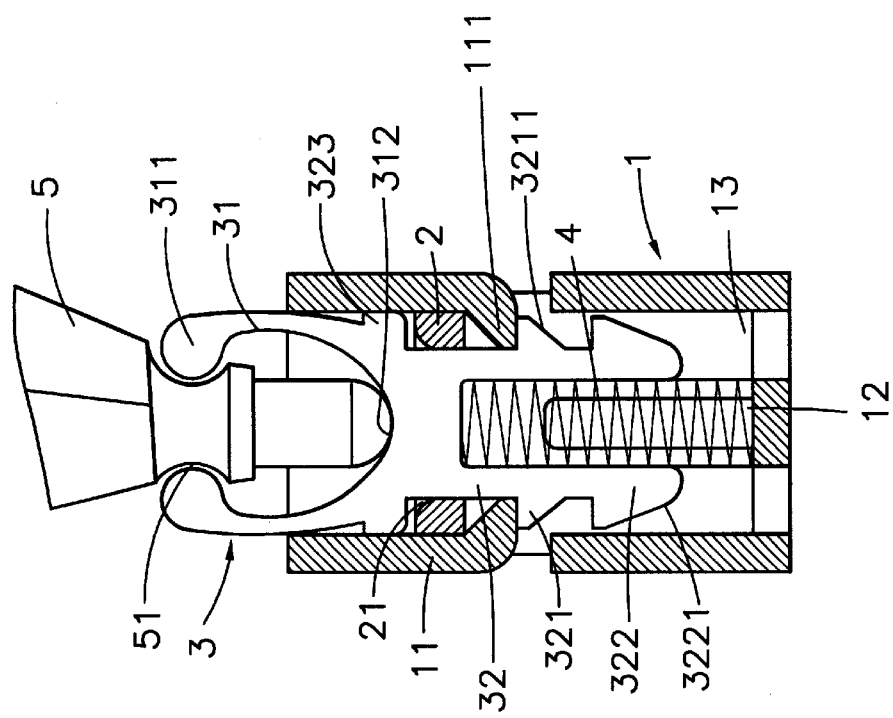
FIG. 3 is a sectional view of the present invention, showing the writing tip of the writing instrument attached to the bearing surface portion of the retainer member.
Figure 4:
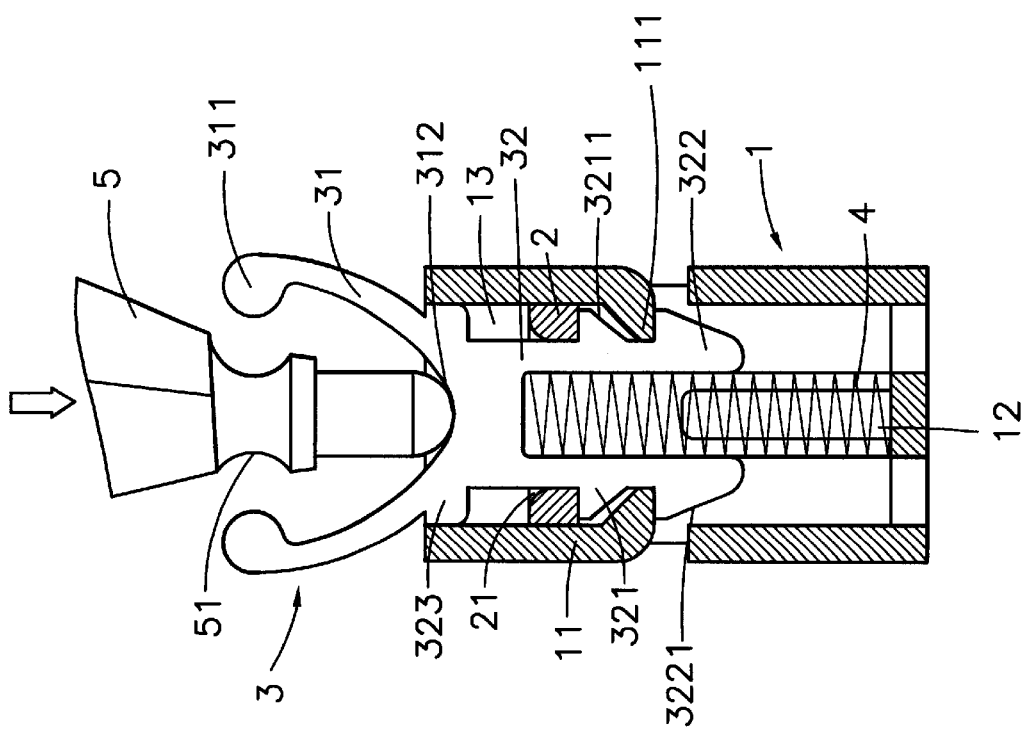
FIG. 4 is another sectional view of the present invention showing the arms clamped on the neck of the writing tip of the writing instrument.
Figure 7:
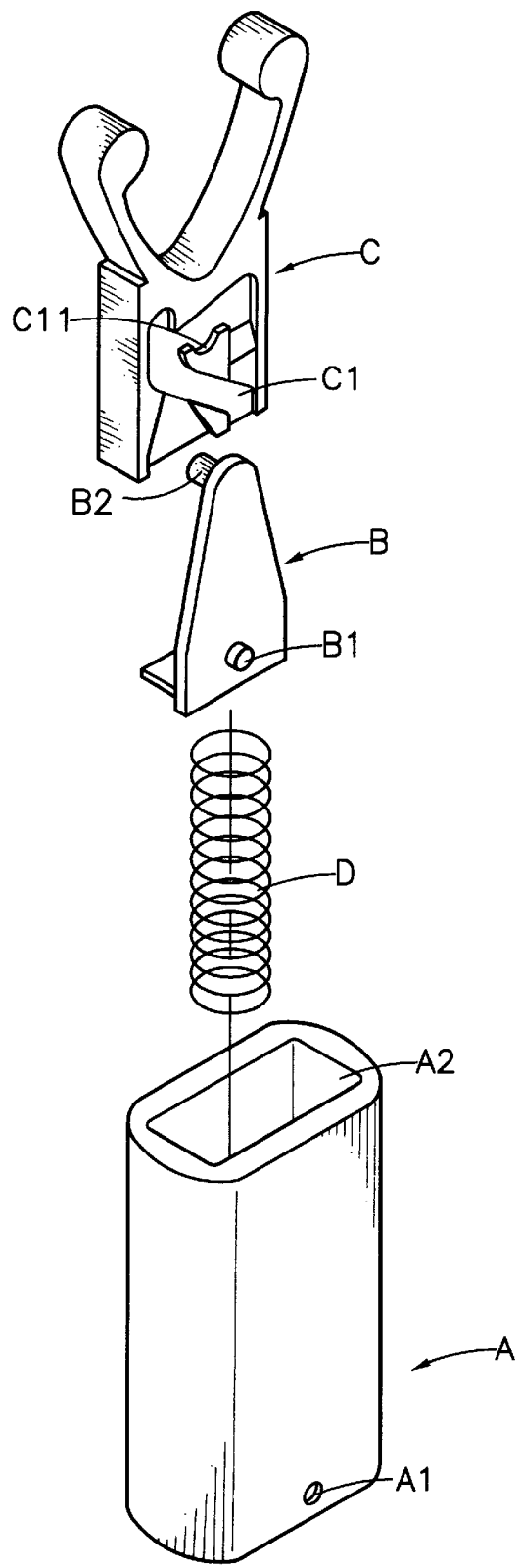
FIG. 7 is an exploded view of a retaining device according to the prior art.

Referring to FIG. 4 and FIG. 3 again, when pressing the writing tip 5 of the writing instrument on the bearing surface portion 312 of the arms 31 to push the retainer member 3 downwards in the casing 1, the second hooked portions 321 are moved over the engagement flanges 11 of the casing 1 and then hooked up with engagement flanges 11 at the bottom side, and at the same time the arms 31 are compressed inwards by the peripheral wall of the top-open receiving chamber 13 of the casing 1 to force the respective retaining end portions 311 into engagement with a neck 51 of the writing tip 5 of the writing instrument, and therefore the press-control retaining device is secured to the writing tip 5 of the writing instrument.

Referring to FIGS. 5 and 6 and FIG. 3 again, when pressing the retainer member 3 downwards again to the bottom limit position in the top-open receiving chamber 13 of the casing 1, the stop flanges 323 force the slide 2 into engagement between the hooked portion 111 of the engagement flanges 11 of the casing 1. Thereafter, the downward pressure is released from the writing tip 5, enabling the retainer member 3 to be moved upwards by the spring power of the spring 4. Because the second hooked portions 321 are stopped below the slide 2 during up stroke of the retainer member 3, the second hooked portions 321 are allowed to pass over the hooked portions 111 of the engagement flanges 11 to the elevation above the engagement flanges 11. After the second hooked portions 321 had been moved upwardly over the hooked portions 111 of the engagement flanges 11, the engagement flanges 11 and the arms 31 automatically return to their former shape due to the effect of their springy material property, and therefore the retaining end portions 311 of the arms 31 are disengaged from the neck 51 of the writing tip 5 of the writing instrument (see FIG. 3), for enabling the writing instrument to be removed from the press-control retaining device.

While only one embodiment of the present invention has been shown and described, it will be understood that various modifications and changes could be made thereunto without departing from the spirit and scope of the invention disclosed.

What the invention claimed is:

1. A press-control retaining device comprising:
   a casing, said casing comprising a top-open receiving chamber, and two springy engagement flanges disposed at two sides of said top-open receiving chamber, said engagement flanges each having a downwardly inwardly extended hooked portion;
   spring means mounted inside said top-open receiving chamber of said casing;
   a retainer member supported on said spring means in said casing and adapted for securing to an external object, said retainer member comprising a substantially ⊓-shaped bottom positioning base supported on said spring means inside said casing, and two springy arms upwardly outwardly extended from said bottom positioning base and adapted for clamping on an external object, said bottom positioning base comprising two first hooked portions bilaterally disposed at a bottom side, two stop flanges bilaterally disposed at a top side, and two second hooked portions respectively spaced between said first hooked portions and said stop flanges, said first and second hooked portions each having a beveled bottom edge; and
   a slide coupled to said retainer member between said stop flanges and said second hooked portions and moved up and down in said top-open receiving chamber of said casing, said slide having a center opening, which receives said bottom positioning base of said retainer member;
   wherein when pressing an external object on the retainer member to force said second hooked portions into engagement with the hooked portions of said engagement flanges of said casing, said arms are compressed inwards by a peripheral wall of said top-open receiving chamber of said casing and clamped on the external object; when pushing the external object to move said retainer member downwards to a bottom limit position in said casing and to force said slide against the hooked portions of said engagement flanges and then releasing the pressure from the external object, said first hooked portions are forced by said spring means into engagement with the hooked portions of said engagement flanges, and said arms are returned to their former shape and released from the external object.

2. The press-control retaining device of claim 1, wherein said springy arms each have one end connected to each other and forming a bearing surface portion, and an opposite end terminating in a retaining end portion respectively curved inwards.

3. The press-control retaining device of claim 1, wherein the retaining end portion of each of said springy arms has a circular profile.

4. The press-control retaining device of claim 1, wherein the retaining end portion of each of said springy arms has a rectangular profile.

5. The press-control retaining device of claim 1, wherein the retaining end portion of each of said springy arms has a conical profile.

6. The press-control retaining device of claim 1, wherein said casing comprises an upright locating rod suspended inside said top-open receiving chamber and adapted to hold one end of said spring means, for enabling said bottom positioning base of said retainer member to be supported on an opposite end of said spring means.

7. The press-control retaining device of claim 1, wherein the horizontal length between two distal ends of said slide is greater than the combined width of said second hooked portions of said bottom positioning base of said retainer member.

* * * * *